(12) United States Patent
Wilhelm

(10) Patent No.: US 12,108,740 B2
(45) Date of Patent: Oct. 8, 2024

(54) PET TOY

(71) Applicant: Doskocil Manufacturing Company, Inc., Arlington, TX (US)

(72) Inventor: Josiah Wilhelm, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 145 days.

(21) Appl. No.: 17/085,843

(22) Filed: Oct. 30, 2020

(65) Prior Publication Data

US 2021/0259209 A1 Aug. 26, 2021

Related U.S. Application Data

(60) Provisional application No. 62/979,791, filed on Feb. 21, 2020.

(51) Int. Cl.
*A01K 15/02* (2006.01)
*A63B 65/12* (2006.01)

(52) U.S. Cl.
CPC .......... *A01K 15/025* (2013.01); *A63B 65/122* (2013.01)

(58) Field of Classification Search
CPC .... A01K 15/025; A01K 15/02; A01K 15/027; A63H 33/18; A63B 2208/14; A63B 65/12; A63B 59/30; A63B 47/02; A63B 47/00; A63B 57/20; A63B 49/035; B25B 9/04; B25B 9/00; F41B 3/04; F41B 3/00; E05D 5/14; E05D 2007/0072
USPC .................. 473/531, 460, 517; 119/707, 702
See application file for complete search history.

(56) References Cited

U.S. PATENT DOCUMENTS

| | | | |
|---|---|---|---|
| 4,746,119 A * | 5/1988 | Jeanrot | A63B 60/54 473/531 |
| 4,759,953 A | 7/1988 | Uso, Jr. et al. | |
| 9,909,617 B1 * | 3/2018 | Prey | F16B 7/0426 |
| 2008/0004140 A1 | 1/2008 | Matsumoto et al. | |
| 2009/0025699 A1 * | 1/2009 | Mongkolkasetarin | A01K 15/025 124/26 |
| 2012/0048251 A1 | 3/2012 | Oblack et al. | |
| 2012/0227721 A1 * | 9/2012 | Geller | A63B 60/10 124/5 |
| 2013/0186381 A1 | 7/2013 | Hansen | |
| 2015/0090237 A1 * | 4/2015 | Williams | A63B 65/122 124/16 |

(Continued)

OTHER PUBLICATIONS

International Search Report and Written Opinion issued Apr. 15, 2021 in corresponding International Patent Application No. PCT/US2021/016170, filed Feb. 2, 2021.

*Primary Examiner* — Peter M Poon
*Assistant Examiner* — Jeffrey R Larsen
(74) *Attorney, Agent, or Firm* — Global IP Counselors, LLP

(57) ABSTRACT

A pet toy includes a first section, a second section and a slide lock. The first section has a distal end and a proximal end, and a handle disposed at the proximal end. The second section has a distal end and a proximal end, and a gripper disposed at the distal end. The proximal end of the second section is pivotally attached to the distal end of the first section to form a hinge. The slide lock is configured to slide along at least one of the first and second sections so as to overlie the proximal end of the second section and the distal end of the first section to cover the hinge, locking the hinge and prohibiting pivotal movement between the first section and the second section.

16 Claims, 10 Drawing Sheets

(56) References Cited

U.S. PATENT DOCUMENTS

2016/0096095 A1    4/2016   Williams
2016/0375333 A1   12/2016   Fryer et al.

* cited by examiner

PET TOY

PRIORITY

This patent application claims priority to U.S. Provisional Patent Application No. 62/979,791, filed Feb. 21, 2020 and entitled "Pet Toy," the entire contents of which are incorporated herein by reference and relied upon.

BACKGROUND

Field of the Invention

The present invention relates to a pet toy. In particular, the present invention relates to a pet toy that is a launcher or thrower that can launch or throw a ball or other object.

Background

Many dog owners play with their pets by throwing balls. Many pets can easily pick up a tennis balls and carry the ball around, based on its size. However, frequently, when a ball is returned (i.e., fetched by the dog) and the dog owner picks up the ball to toss it again, it can be wet from saliva in the dog's mouth.

Additionally, many dog owners desire to be able to throw the ball even further away but this is difficult to accomplish due to the light weight of the ball. To satisfy these needs, conventional devices have been created to aid in picking up the ball and in throwing a ball. One brand for such type of device is "CHUCKIT"®.

SUMMARY

It has been discovered that an improved launcher is desired. In particular, it has been discovered that an improved launcher that is capable of compact storage is desired. In view of the state of the known technology, one aspect of the present disclosure is to provide a pet toy that includes a first section, a second section and a slide lock. The first section has a distal end and a proximal end, and a handle disposed at the proximal end of the first section. The second section has a distal end and a proximal end, and a gripper disposed at the distal end of the second section. The proximal end of the second section is pivotally attached to the distal end of the first section to form a hinge, and the gripper is configured to grip a throwable toy. The slide lock is configured to slide along at least one of the first and second sections so as to overlie the proximal end of the second section and the distal end of the first section to cover the hinge, locking the hinge and prohibiting pivotal movement between the first section and the second section.

In accordance with a second aspect of the present disclosure, which can be combined with any other aspect described herein, the gripper is configured to grip a ball.

In accordance with a third aspect of the present disclosure, which can be combined with any other aspect described herein, the gripper has a semi-spherical configuration.

In accordance with a fourth aspect of the present disclosure, which can be combined with any other aspect described herein, the slide lock is generally tubular.

In accordance with a fifth aspect of the present disclosure, which can be combined with any other aspect described herein, the slide lock is configured to slide along the second section in the direction of the gripper.

In accordance with a sixth aspect of the present disclosure, which can be combined with any other aspect described herein, the first section is configured to pivot about 180 degrees relative to the second section.

In accordance with a seventh aspect of the present disclosure, which can be combined with any other aspect described herein, a retainer is configured to couple the proximal end of the first section to the distal end of the second section.

In accordance with a eighth aspect of the present disclosure, which can be combined with any other aspect described herein, the retainer is elastic.

In accordance with a ninth aspect of the present disclosure, which can be combined with any other aspect described herein, a method of operating a pet toy comprises providing a pet toy having a first section, a second section, a retainer connected to the first section and a slide lock slidable relative to the first and second sections, releasing the retainer from the second section, pivoting the first second relative to the second section about a hinge, such that the first and second sections generally extend along a longitudinal line, sliding the lock relative to the first and second sections so as to overlie a proximal end of the second section and a distal end of the first section to cover the hinge, locking the hinge and prohibiting pivotal movement between the first section and the second section, and attaching a pet toy to a gripper at a distal end of the second section.

In accordance with a tenth aspect of the present disclosure, which can be combined with any other aspect described herein, the attaching the throwable toy includes attaching a ball.

In accordance with a eleventh aspect of the present disclosure, which can be combined with any other aspect described herein, the gripper has a semi-spherical configuration.

In accordance with a twelfth aspect of the present disclosure, which can be combined with any other aspect described herein, the slide lock is generally tubular.

In accordance with a thirteenth aspect of the present disclosure, which can be combined with any other aspect described herein, sliding the slide lock slides includes sliding the slide lock along the second section in the direction of the gripper.

In accordance with a fourteenth aspect of the present disclosure, which can be combined with any other aspect described herein, the pivoting the first second relative to the second section about the hinge includes pivoting the first section about 180 degrees relative to the second section.

In accordance with a fifteenth aspect of the present disclosure, which can be combined with any other aspect described herein, the retainer couples a proximal end of the first section to a distal end of the second section.

In accordance with a sixteenth aspect of the present disclosure, which can be combined with any other aspect described herein, the retainer is elastic.

As can be understood, the embodiments of the present disclosure provide a ball throwing apparatus that can be used to play the game of fetch with an animal without physically touching the ball with the hand or fingers. Moreover, the embodiments described herein provide an apparatus that is safe, easy to use, and economical to manufacture, and can be conveniently configured to be smaller and easier to carry, since it can be quickly folded.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
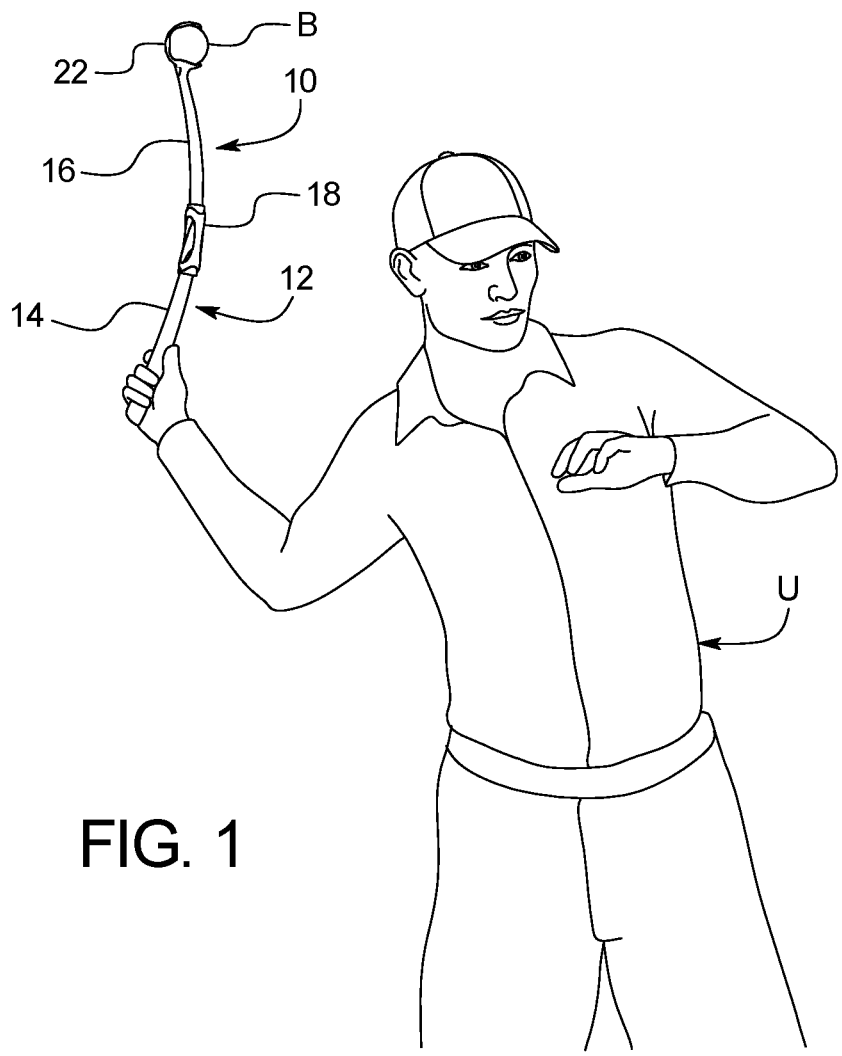
FIG. 1 shows a user using a pet toy according to an embodiment of the present invention to throw a throwable toy for a pet.
Figure 2:
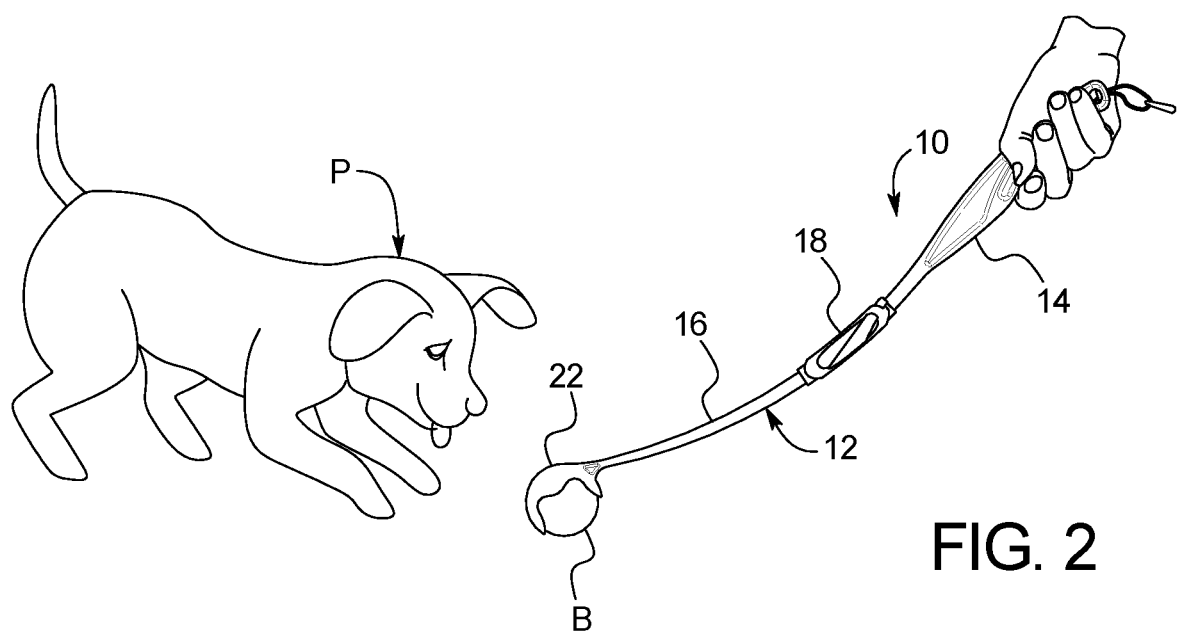
FIG. 2 illustrates the user U of FIG. 1 picking up the throwable toy without use of hands.
Figure 3:
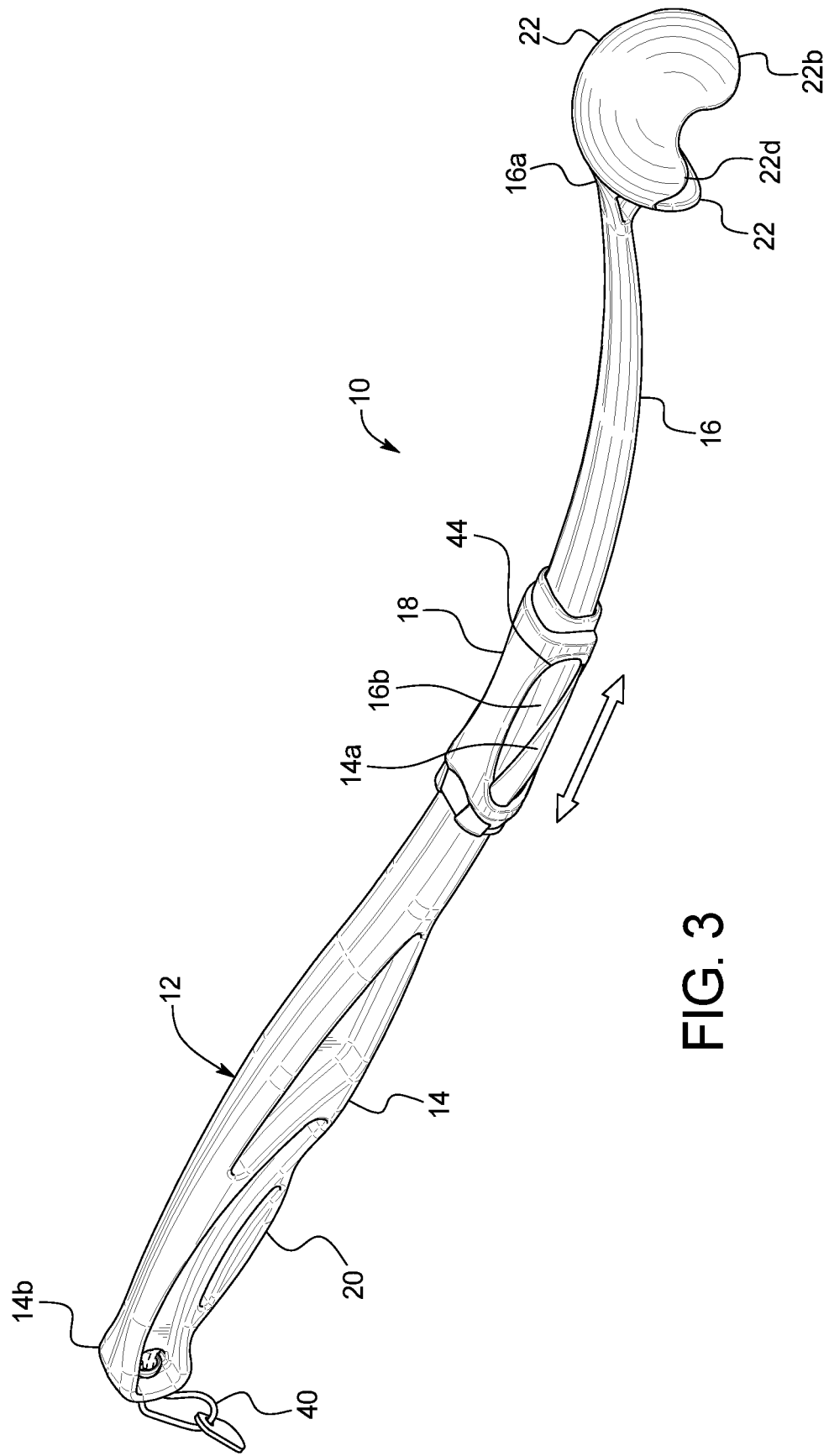
FIG. 3 illustrates a perspective view of the pet toy according to an embodiment of the present invention.

Referring initially to FIGS. 1-3, a pet toy 10 is illustrated in accordance with a first embodiment. The pet toy 10 is a launcher that includes an elongated shaft 12 having a first section 14, a second section 16 and a slide lock 18. The first section 14 has a distal end 14a and a proximal end 14b, and a handle 20 disposed at the proximal end 14b of the first section 14. The second section 16 has a distal end 16a and a proximal end 16b, and a gripper 22 disposed at the distal end 16a of the second section 16. The proximal end 16b of the second section 16 is pivotally attached to the distal end 14a of the first section 14 to form a hinge 24, and the gripper 22 is configured to grip a throwable toy.

The elongated shaft 12 has a sufficient length so that a throwable toy (e.g., ball B) may be easily thrown great distances during use. The elongated shaft 12 also has a sufficient length to enable the throwable toy (or other object) to be easily and safely engaged, when resting adjacent to the animal (e.g., pet P), without touching the throwable toy or the animal's saliva with one's hands or fingers.

As shown in FIG. 1, the user U can grip the handle 20 of the pet toy 10 with the throwable toy (e.g., ball B) disposed within the gripper 22. The user U can then throw the throwable toy for the pet P to retrieve. As can be understood, the elongated shaft 12 enables the user U to throw the throwable toy greater distances than can generally be accomplished without the pet toy 10.

Additionally, as shown in FIG. 2, the elongated shaft 12 enables the user U to easily reach the throwable toy (e.g., ball B) when the toy is on the ground, and pick up the throwable toy by gripping the toy with the gripper 22. As can be understood, the pet toy 10 enables the user U to pick up the throwable toy without touching the toy. This can be beneficial, since the toy can be muddy, dirty or wet due to animal saliva or otherwise undesirable to touch.

The elongated shaft 12 can be a curved piece of resilient, lightweight material, such as polypropylene plastic, that has sufficient shape memory and flexibility. As discussed above, the elongated haft has a first section 14 and a second section 16 connected to the first section 14 with an articulated joint or hinge 24. The hinge 24 can be locked with the slide lock 18. When the hinge 24 is locked, the first section 14 and a second section 16 generally extend along a longitudinal line.

Figure 4:
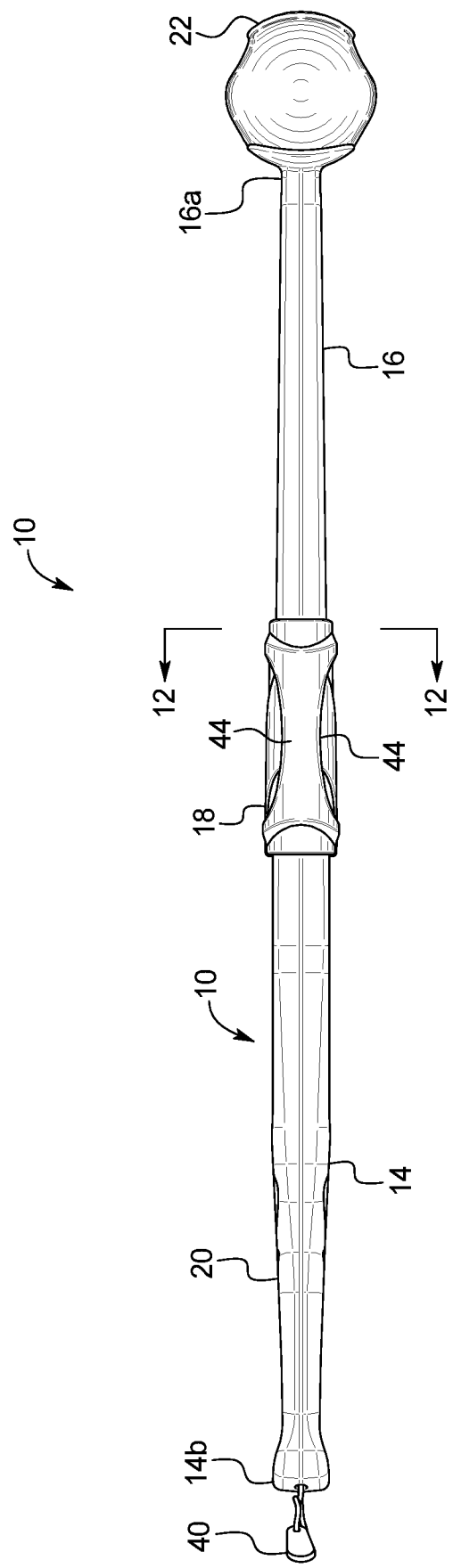
FIG. 4 is a top plan view of the pet toy of FIG. 3.
Figure 10:
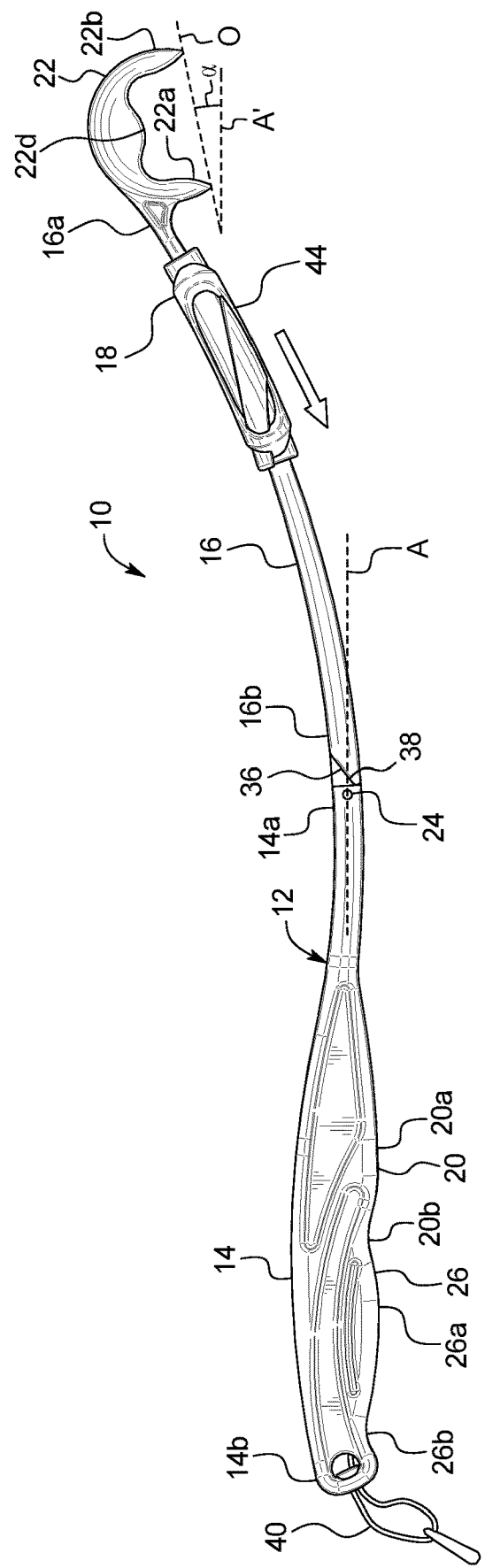
FIG. 10 is a side view of the pet toy of FIG. 4 with the slide lock in an unlocked position.
Figure 11:
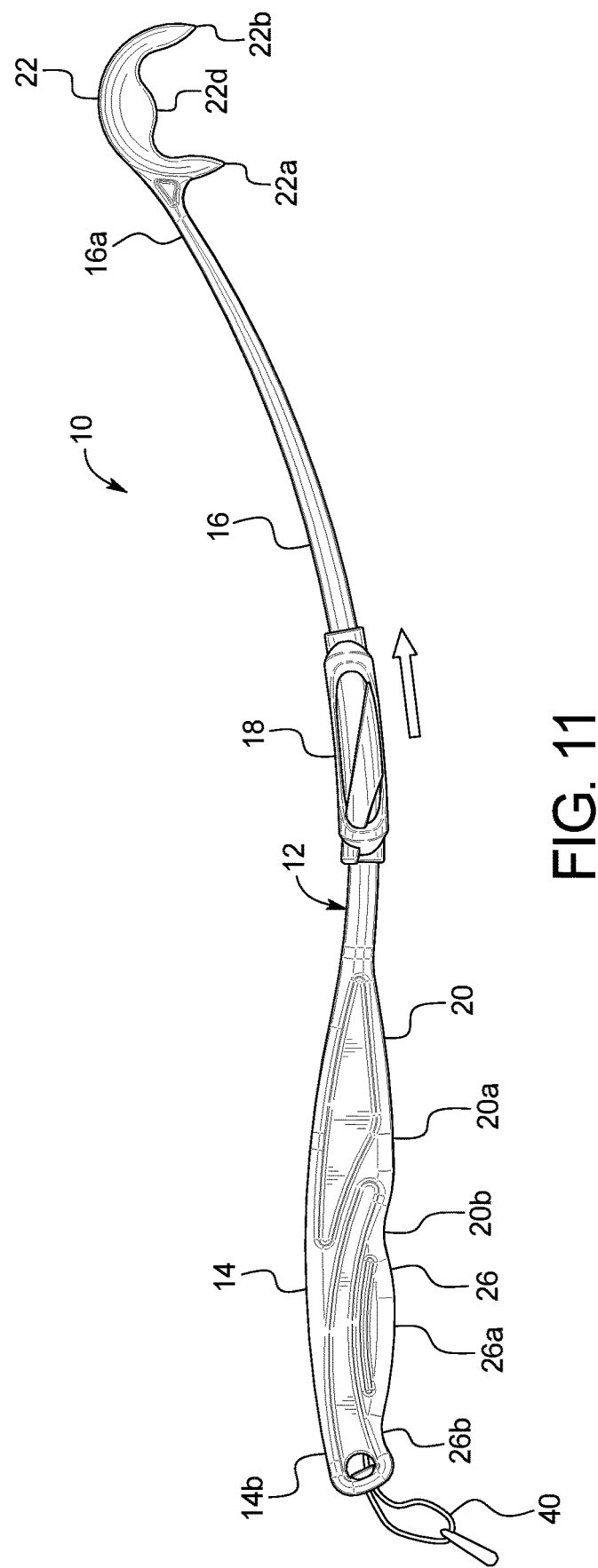
FIG. 11 is a side view of the pet toy of FIG. 4 with the slide lock in a locked position.

As discussed above, the first section 14 includes a distal end 14a and a proximal end 14b, and a handle 20 is disposed at the proximal end 14b of the first section 14. When viewed from a side view, the handle 20 of the first section 14 can be wider than the second section 16. Further, the handle 20 can be the widest portion of the elongated shaft 12 of the pet toy 10. That is, as shown in FIGS. 3 and 10, the handle 20 can extend from approximately the proximal end 14b of the first section 14, having an ergonomical portion 26 for gripping with the user's hand and then taper into the shaft portion of the first section 14. The first section 14 can then taper to the distal end 14a of the first section 14. The handle 20 can include finger grips as the ergonomical portion 26, such as protrusions 26a and recesses 26b for easier handling. In one embodiment, the center portion of the handle 20 is recessed on both sides, thereby reducing the overall weight of the shaft 12. See for example, FIG. 4. The second section 16 of the shaft 12 can be stiff yet slightly flexible, acting as a spring when engaging the throwable toy on the ground and when throwing the throwable toy. In one embodiment, the second section 16 has a width that is less than the first section 14 and can be slightly tapered from the proximal end 14b to the distal end 14a. The thinner width of the second section 16 contributes to the flexibility of the second section 16 enabling a whipping or springing action when throwing.

In one embodiment, the second section 16 has the gripper 22 disposed at the distal end 16a. In one embodiment, the gripper 22 is a half-spherical plastic structure with an inner radius equal to or slightly smaller than the outer radius of the throwable toy (e.g., ball B or other structure) to be inserted into the gripper 22. Formed on the distal and proximal surfaces of the gripper 22 are a plurality of curved, equally spaced flexible leafs 22a-d that curve and substantially follow the outer radius of the throwable toy. The leafs 22a-d can extend past the mid-axis of the throwable toy (for example see FIGS. 1 and 2 in which the throwable toy is the ball B) when the throwable toy is attached or disposed inside the gripper 22. When attaching the throwable toy to the gripper 22, the gripper 22 is positioned above the throwable toy and pressed downward. The leafs 22a-d can bend outward to snap around the throwable toy and hold it inside or partially inside the gripper 22. In one embodiment, the leafs 22a-d can flex outwardly to accommodate the throwable toy and grip the throwable toy with an interference fit. Thus, it is not necessary for the gripper 22 to snap fit around the throwable toy, although a snap fit can be a suitable embodiment.

In one embodiment, the shaft 12 (i.e., the combination of the first and second sections 14 and 16) is between 18 and 32 inches in length. The gripper 22 is integrally formed on the distal end 16a of the second section 16 of the shaft 12 and is made of the same material as the shaft 12. The gripper 22 can have an inside radius of approximately 1.25 inches, thereby enabling it to tightly receive a standard tennis ball which measures approximately 2.57 inches in diameter. As shown in FIG. 10, the shaft 12 can be slightly curved in a rearward direction and the gripper 22 can be aligned on the distal end 16a of the second section 16 of the shaft 12 so that the opening plane O of the gripper 22 is aligned approximately between 5 degrees forward and 33 degrees behind a line parallel A' to the shaft's longitudinal axis A. By slightly curving the shaft 12, the user U is able to reach under the animals mouth while standing adjacent to the animal.

It is noted that, in one embodiment, the gripper 22 can have the same or a similar structure to the gripper for the launcher sold by the present assignee under the CHUCKIT! brand. An example embodiment of the gripper for a launcher is illustrated and described in U.S. Pat. No. 6,076,829, the entire contents of which is incorporated herein by reference and relied upon. It is noted that while the gripper disclosed in U.S. Pat. No. 6,076,829 is one exemplary embodiment, the gripper 22 described herein is not limited to the structure or description of the gripper in U.S. Pat. No. 6,076,829.

Figure 5:
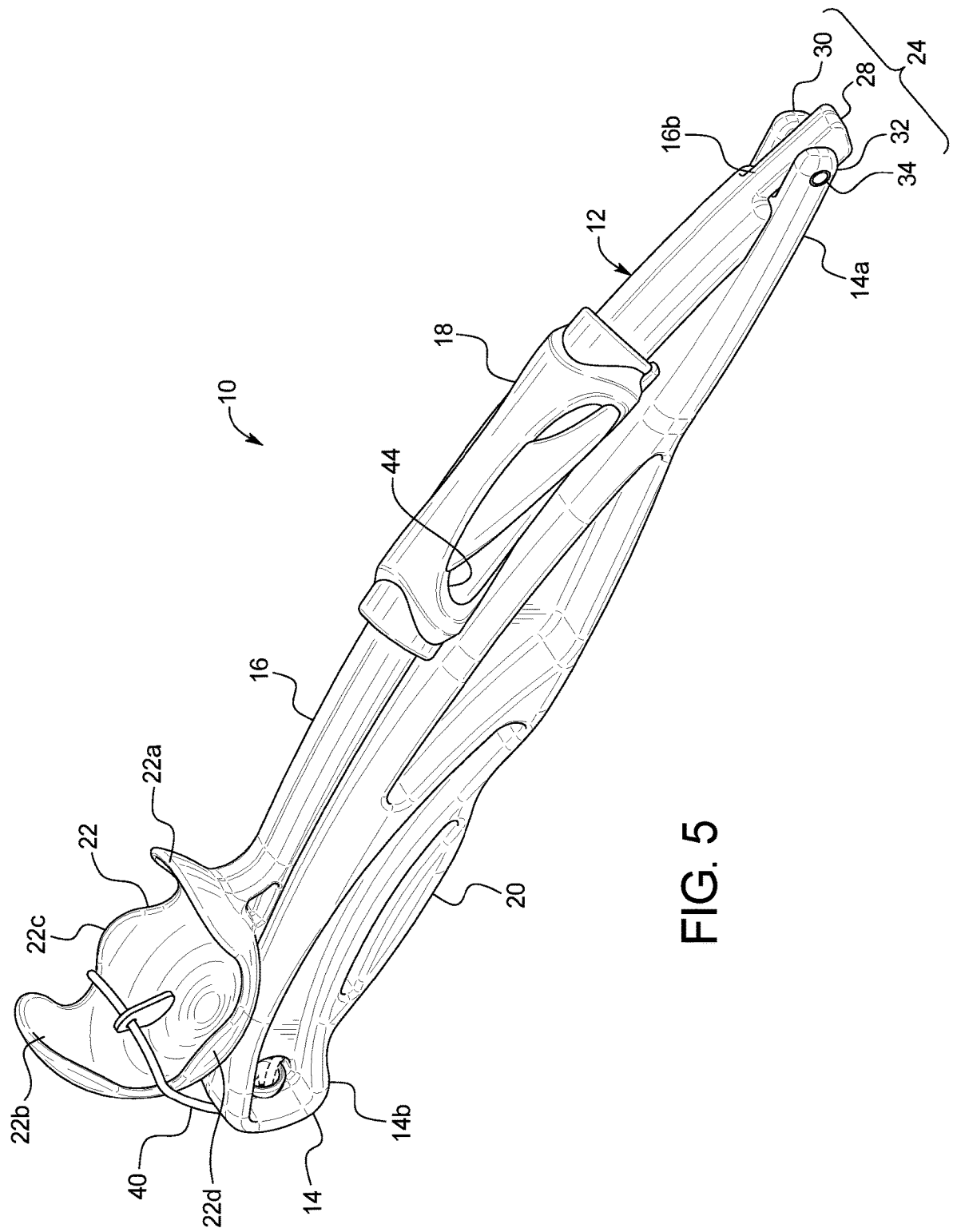
FIG. 5 is a perspective view of the pet toy of FIG. 3 in a folded configuration.
Figure 7:
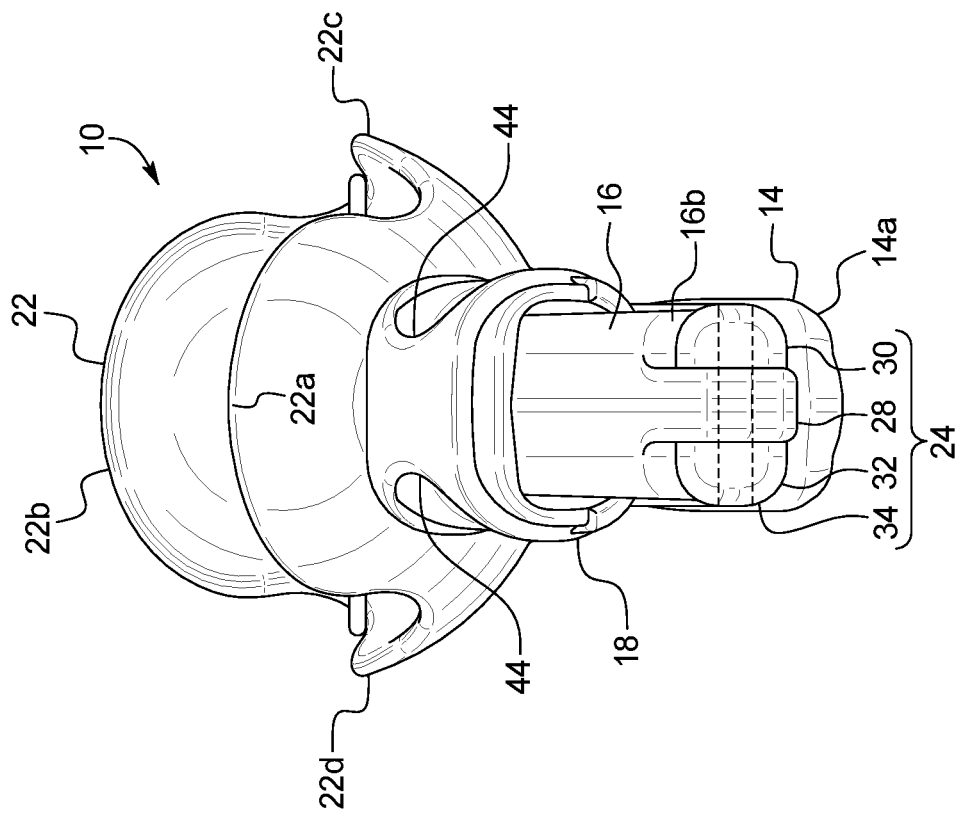
FIG. 7 is a second end view of the pet toy of FIG. 5.
Figure 6:
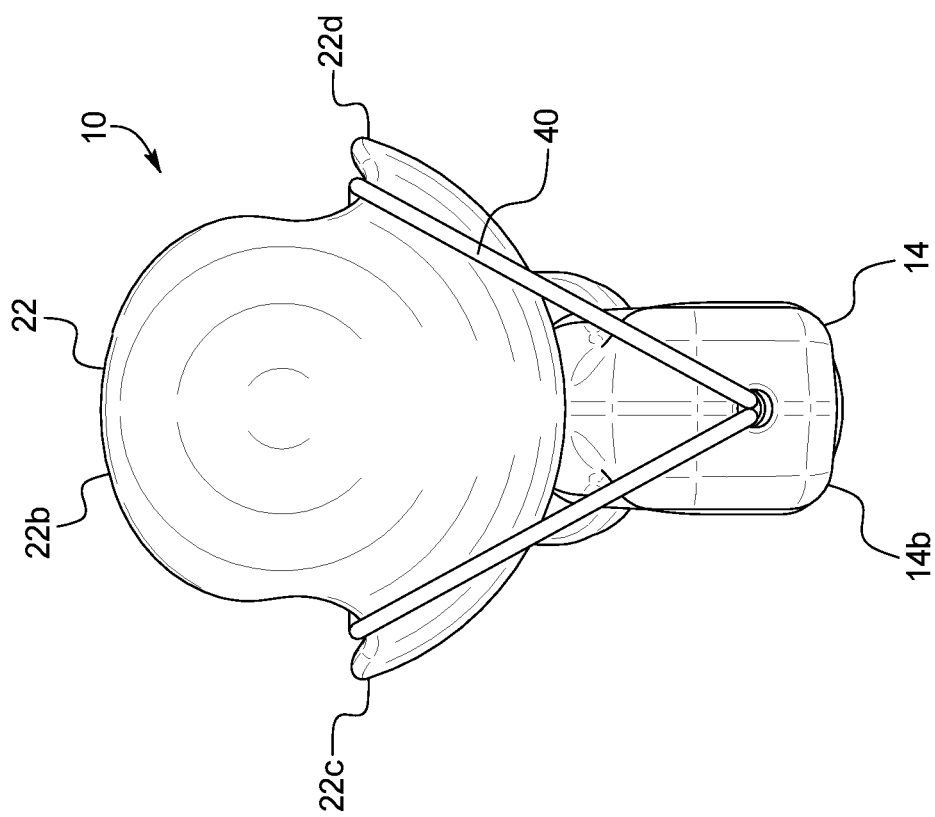
FIG. 6 is a first end view of the pet toy of FIG. 5.
Figure 8:
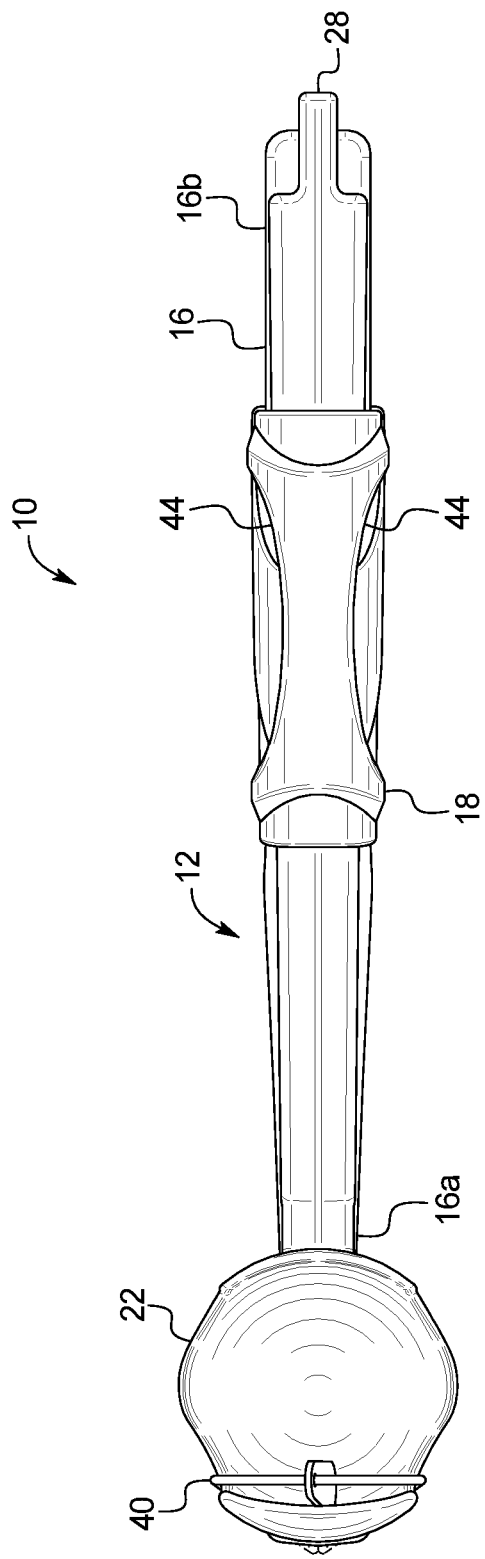
FIG. 8 is a top plan view of the pet toy of FIG. 5.
Figure 9:
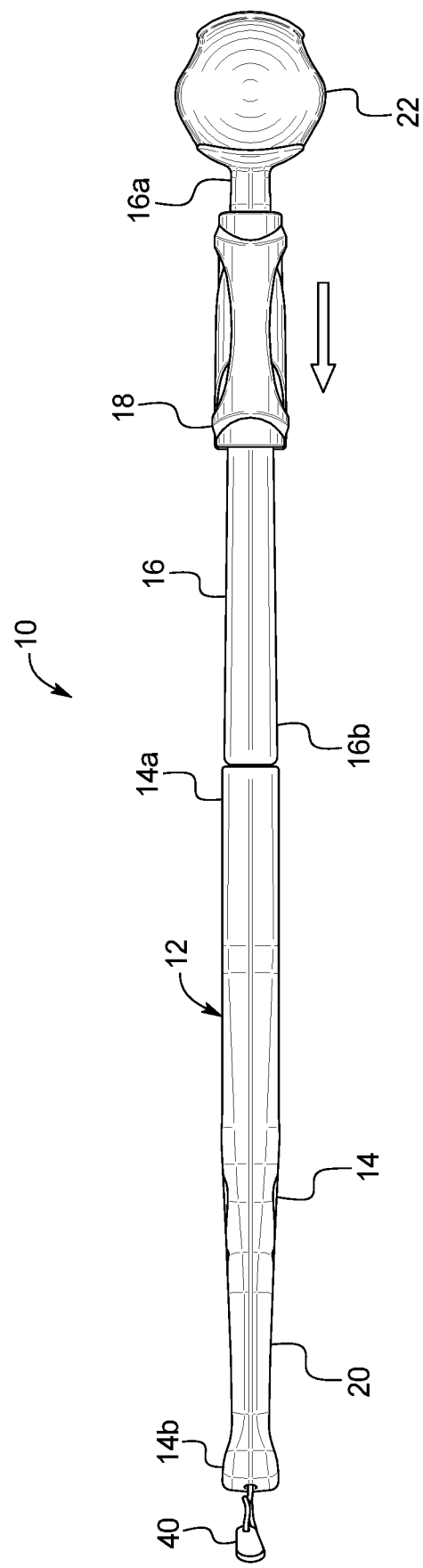
FIG. 9 is a top plan view of the pet toy of FIG. 4 with the slide lock in an unlocked position.

In one embodiment, the proximal end 16*b* of the second section 16 is pivotally attached to the distal end 14*a* of the first section 14 to form a hinge 24 or articulated joint. The first section 14 is configured to pivot about 180 degrees relative to the second section 16. As shown in FIGS. 5, 7 and 10, the second section 16 can have a protrusion 28 at the distal end 16*b* that is disposed between two flanges 30 and 32 on the proximal end 16*b* of the first section 14. A pin or shaft 34 extends laterally through the flanges 30 and 32 and protrusion 28 to enable the first section 14 to pivot relative to the second section 16. Thus, as can be understood, the protrusion 28, the two flanges 30 and 32 and the pin 34 can form the hinge 24.

Additionally, the first and second sections 14 and 16 can have complimentary mating surfaces 36 and 38 that are transverse to the longitudinal extension of the pet toy 10. These complimentary mating surfaces 36 and 38 can engage when the first and second sections 14 and 16 are pivoting into the operating position. See for example, FIG. 10. Thus, as can be understood, the complimentary mating surfaces 36 and 38 can prevent the first section 14 from over rotating relative to the second section 16 and position the first and second sections 14 and 16 in the desired throwing position.

In one embodiment, as shown in FIGS. 5-8, a retainer 40 is coupled to the proximal end 14*b* of the first section 14—i.e., at the handle 20. When the second section 16 is folded relative to the first section 14, the retainer 40 is configured to couple the proximal end 14*b* of the first section 14 to the distal end 16*a* (e.g., in this embodiment to the gripper 22) of the second section 16. As can be understood the retainer 40 can be elastic, like a rubber band, and is configured to be stretched over the gripper 22 and retain the pet toy 10 in a folder position. However, it is noted that the retainer can be any suitable device for retaining or locking the first and second sections 14 and 16 in a folded or stored position.

As shown in FIGS. 9-13, the slide lock 18 is configured to lock the first section 14 relative to the second section 16 such that the pet toy 10 is disposed in the operable (or throwing) position. The slide lock 18 can be a plastic molded piece formed in the same manner and from the same material as the first and second sections 14 and 16. However, it is noted that the slide lock 18 can be any locking mechanism and can be formed in any manner and have any configuration desired.

The slide lock 18 is configured to slide along at least one of the first and second sections 14 and 16 so as to overlie the proximal end 16*b* of the second section 16 and the distal end 14*a* of the first section 14 to cover the hinge 24, locking the hinge 24 and prohibiting pivotal movement between the first section 14 and the second section 16. Thus, in one embodiment, the slide lock 18 can slide along the second section 16 to lock the first and second sections 14 and 16 in position. When in the locked position, the slide lock 18 overlies the hinge 24 or joint between the first and second sections 14 and 16. Preferably the slide lock 18 is made from a material (such as plastic), and has a sufficient length that will prevent significant pivotal movement between the first and second sections 14 and 16. Moreover, as shown by the arrows in the drawings, the slide lock 18 can move longitudinally along the shaft 12.

The slide lock 18 is generally tubular, and more specifically rectangular and tubular. That is, the slide lock 18 defines a longitudinal opening 42 therein, such that the slide lock 18 surrounds the shaft 12. See for example, FIGS. 12 and 13. This configuration enables the slide lock 18 to slide along the second section 16 in the direction of the gripper 22. The slide lock 18 can have openings 44 that pass through the lock from the outer surface 46 to the inner surface 48. These openings 44 can reduce weight and enable the user to see the shaft 12 and/or the hinge 24 through the slide lock 18.

Figure 12:
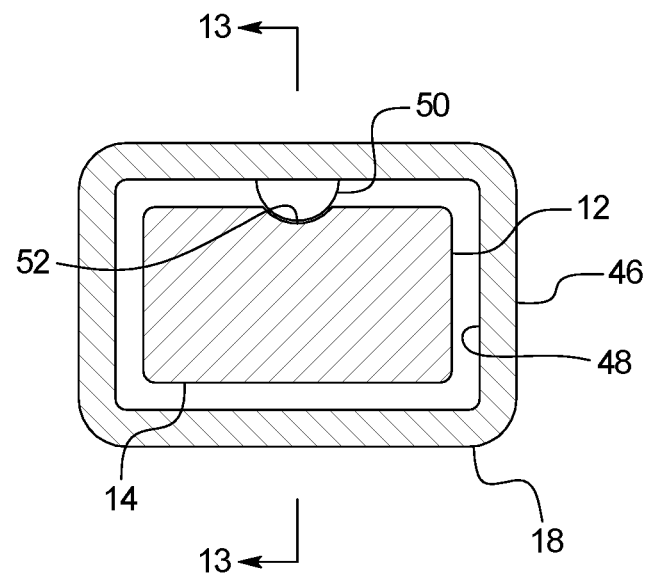
FIG. 12 is a cross sectional view of the pet toy tacked along line 12-12 in FIG. 4.
Figure 13:
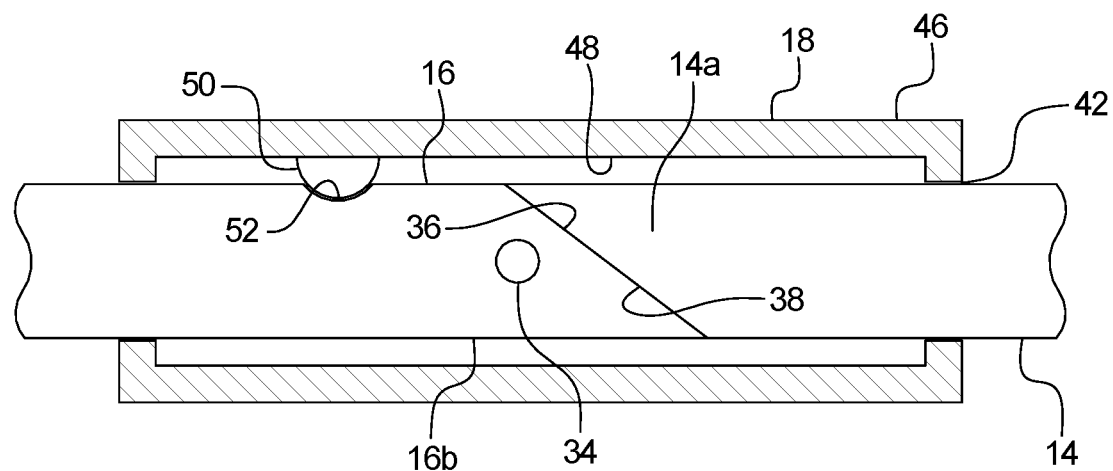
FIG. 13 is a cross sectional view of the pet toy tacked along line 13-13 in FIG. 12.

As shown in FIGS. 12 and 13, one end of the slide lock 18 can have a protrusion 50 that extends inwardly on the inner surface 48. The protrusion 50 is preferably a semi-spherical or hemi-spherical protrusion. The protrusion 50 is configured to engage a recession 52 in the second section 16 to lock the slide lock 18 in place. Thus, as can be understood, when the slide lock 18 is slid over the hinge 24, the protrusion 50 and the recess 52 are positioned to engage and further frictionally hold the slide lock 18 in place and prevent movement thereof. It is noted that the slide lock 18 can be held in place in any manner desired, and it is not necessary to use the protrusion and recess. For example, since as described above, the first section 14 is wider, the inner surface 48 of the slide lock 18 can be configured to frictionally engage the first section 14 and hold the slide lock 18 in place. Thus, in this embodiment, the protrusion and recess would not be necessary.

During use, when the slide lock 18 is moved from the central position is a direction toward the gripper 22, the hinge 24 will be operable. Thus, the second section 16 can be rotated relative to the first section 14, such that the pet toy 10 is basically folded in half—the second section 16 is 180 degrees disposed from the extended position. The retainer 40 can then be stretched over the gripper 22, locking or retaining the pet toy 10 in a folded configuration. This folded or stored configuration enables the user U to more easily store or carry the pet toy 10, since the size or length of the pet toy 10 is effectively half the length of the pet toy 10 when in the operable position.

To use the pet toy 10, the opposite procedure is employed. First, the retainer 40 is removed. Next, the slide lock 18 is moved along the second section 16 to overlie the proximal end 16*b* of the second section 16 and the distal end 14*a* of the first section 14 to cover the hinge 24, locking the hinge 24 and prohibiting pivotal movement between the first section 14 and the second section 16. The user U will be capable of determining when the slide lock is in a locking position when the protrusion 50 engages the recess 52. That is, as can be understood, in one embodiment, the protrusion 50 on the inner surface of the slide lock 18 engages the recess 52 on the second section 16 further securing and holding the slide lock 18 into position. Thus, when the pet toy 10 is moved through an arc during a launch, the slide lock 18 is securely held in place and does not slide along the second section 16 releasing the hinge 24.

The slide lock 18 thus enables the first and second sections 14 and 16 to form an elongate shaft 12 suitable for launching a throwable toy (e.g., ball B). This configuration also enables the user U to pick up or grip an object to throw for the pet P. It has been found that the embodiments herein provide an improved pet toy 10 that is capable of compact storage. Moreover, the embodiments of the present invention provide an apparatus that can be used to play the game of fetch with an animal without physically touching the throwable toy with the hand or fingers, and provide an apparatus that is safe, easy to use, and economical to manufacture.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the term "section," when used in the singular can have the dual meaning of a single part or a plurality of parts.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed:

1. A pet toy comprising:
a first section having a distal end and a proximal end, and a handle disposed at the proximal end of the first section;
a second section having a distal end and a proximal end, and a gripper disposed at the distal end of the second section, the proximal end of the second section pivotally attached to the distal end of the first section to form a hinge that is configured such that the first section and the second section pivot about the hinge between an operable position and a stored position and the gripper configured to grip a throw-able toy, the distal end of the first section having a first complementary mating surface and the proximal end of the second section having a second complementary mating surface that engage each other in the operable position to prevent over-rotating of the first section relative to the second section; and
a slide lock configured to manually slide along at least one of the first and second sections so as to overlie the proximal end of the second section and the distal end of the first section to cover the hinge, locking the hinge in an operable position and prohibiting pivotal movement between the first section and the second section, the slide lock having one of a protrusion and a recession on an inner surface of the slider lock, one of the first and second sections having the other of the protrusion and the recession on an outer surface thereof, the protrusion having a semi-spherical shape and the recession having a concaved semi-spherical shape, the recession complimenting the semi-spherical shape of the protrusion such that in the operable position the protrusion extends into and engages the recession with the protrusion and the recession are completely covered by the slide lock, the recession and the protrusion frictionally engaging with each other locking the hinge in the operable position, the protrusion protruding towards the recession in an extension direction that is perpendicular with respect to a longitudinal direction of the slide lock, the first and second complementary mating surfaces being spaced from the protrusion, the first and second complementary mating surfaces extending at respective complementary angles with respect to the extension direction of the protrusion, and when the slide lock is manually slid away from the operable position the hinge is exposed such that the first section and the second section pivot about the hinge and fold to a stored position.

2. The pet toy according to claim 1, wherein the gripper is configured to grip a ball.

3. The pet toy according to claim 1, wherein the gripper has a semi-spherical configuration.

4. The pet toy according to claim 1, wherein the slide lock is generally tubular.

5. The pet toy according to claim 1, wherein the slide lock is configured to slide along the second section in the direction of the gripper.

6. The pet toy according to claim 1, wherein the first section is configured to pivot about 180 degrees relative to the second section.

7. The pet toy according to claim 1, further comprising a retainer configured to couple the proximal end of the first section to the distal end of the second section.

8. The pet toy according to claim 1, wherein the retainer is elastic.

9. A method of operating a pet toy, comprising:
providing the pet toy having a first section, a second section, a hinge configured such that the first section and second section pivot relative to one another about the hinge between an operable position and a stored position, a retainer connected to the first section, and a slide lock slidable relative to the first and second sections, the retainer being releasably retaining the second section alongside the first section in the stored position, the first and second sections having complementary mating surfaces adjacent to the hinge that engage each other when in the operable position to prevent over-rotating of the first section relative to the second section, the first and second mating surfaces being complementary slanted with respect to each other;
releasing the retainer from the second section;

pivoting the first second relative to the second section about the hinge away from the stored position and to the operable position, such that in the operable position the first and second sections generally extend along a longitudinal line;

manually sliding the slide lock relative to the first and second sections so as to overlie a proximal end of the second section and a distal end of the first section to cover the hinge, locking the hinge and prohibiting pivotal movement between the first section and the second section, the slide lock having one of a protrusion and a recession on an inner surface thereof, one of the first and second sections having the other of the protrusion and the recession on an outer surface thereof, the protrusion having a semi-spherical shape and the recession having a concaved semi-spherical shape, the recession complimenting the semi-spherical shape of the protrusion such that in the operable position the protrusion extends into and engages the recession in response to manual sliding of the slide lock causing frictional engagement between the recession and the protrusion locking the hinge in the operable position, in the operable position the protrusion protrudes into the recession in an extension direction that is perpendicular with respect to a longitudinal direction of the slide lock, the first and second mating surfaces being spaced from the protrusion, the first and second mating surfaces extending at an angle with respect to the extension direction of the protrusion; and attaching a throwable toy to a gripper at a distal end of the second section.

10. The method according to claim 9, wherein the attaching the throwable toy includes attaching a ball.

11. The method according to claim 9, wherein the gripper has a semi-spherical configuration.

12. The method according to claim 9, wherein the slide lock is generally tubular.

13. The method according to claim 9, wherein sliding the slide lock slides includes sliding the slide lock along the second section in the direction of the gripper.

14. The method according to claim 9, wherein the pivoting the first second relative to the second section about the hinge includes pivoting the first section about 180 degrees relative to the second section.

15. The method according to claim 9, wherein the retainer couples a proximal end of the first section to a distal end of the second section.

16. The method according to claim 9, wherein the retainer is elastic.

\* \* \* \* \*